Figure 1:
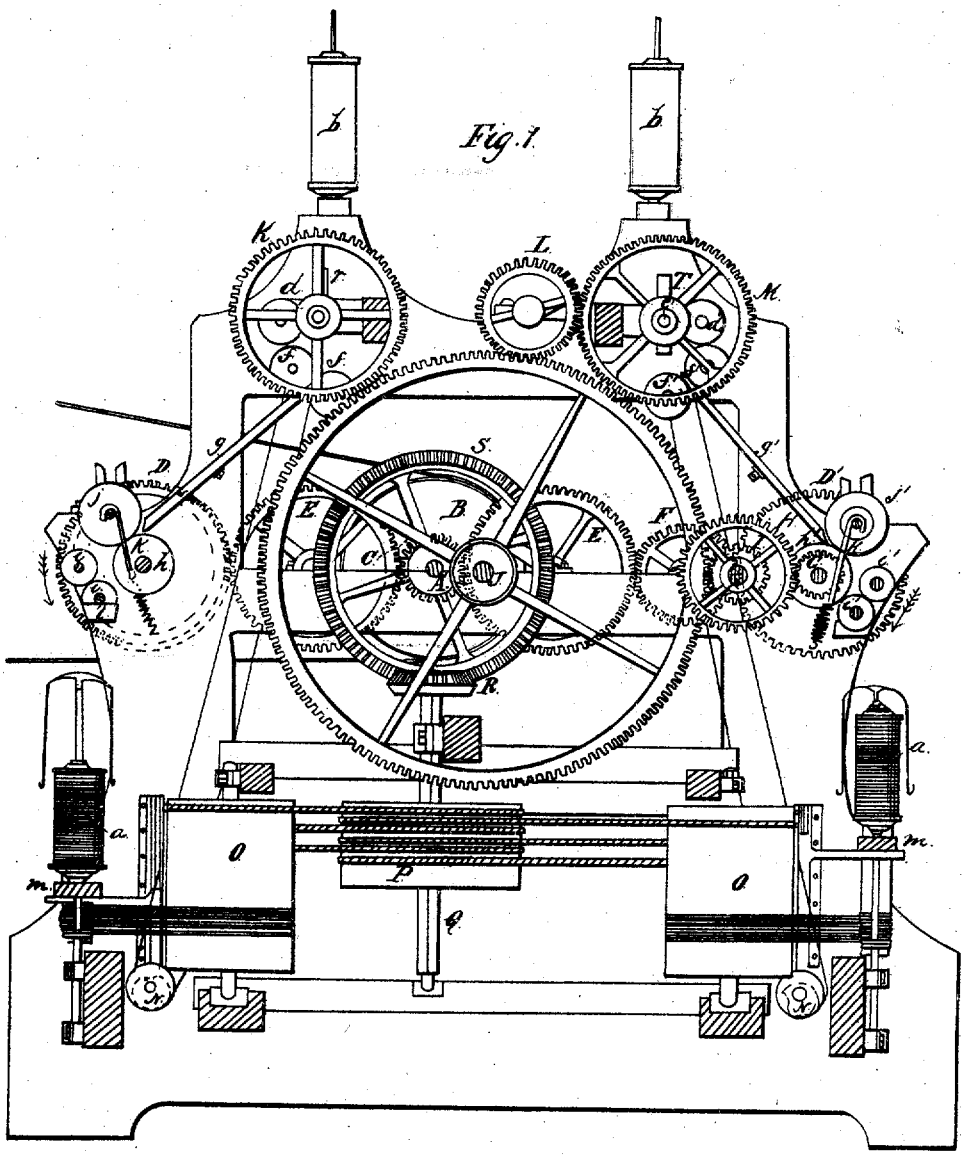
Figure 1:
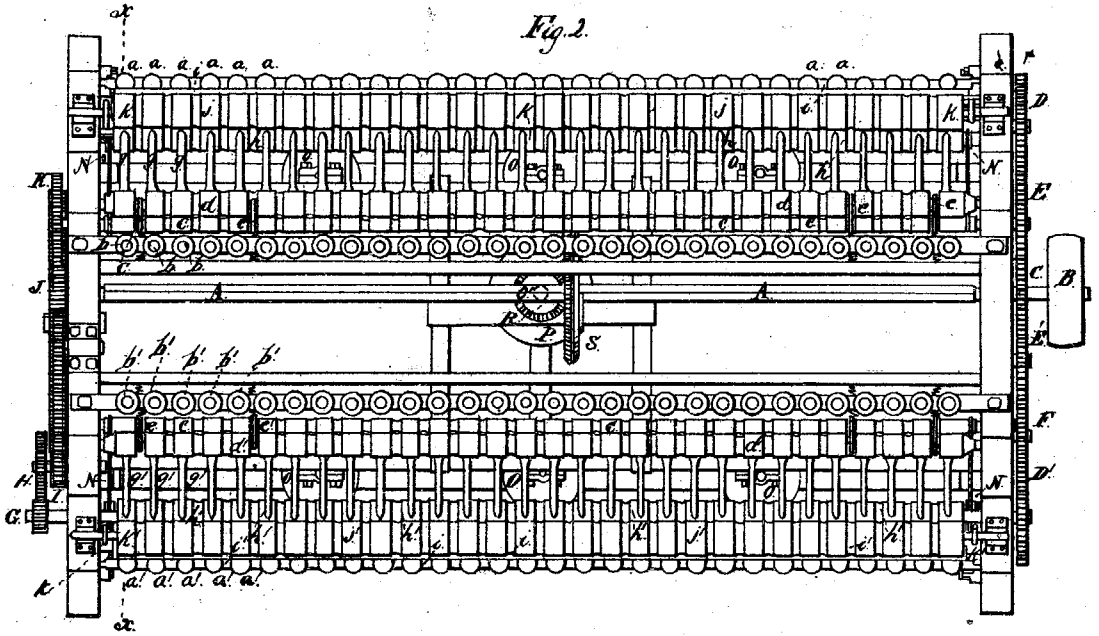
Figure 2:
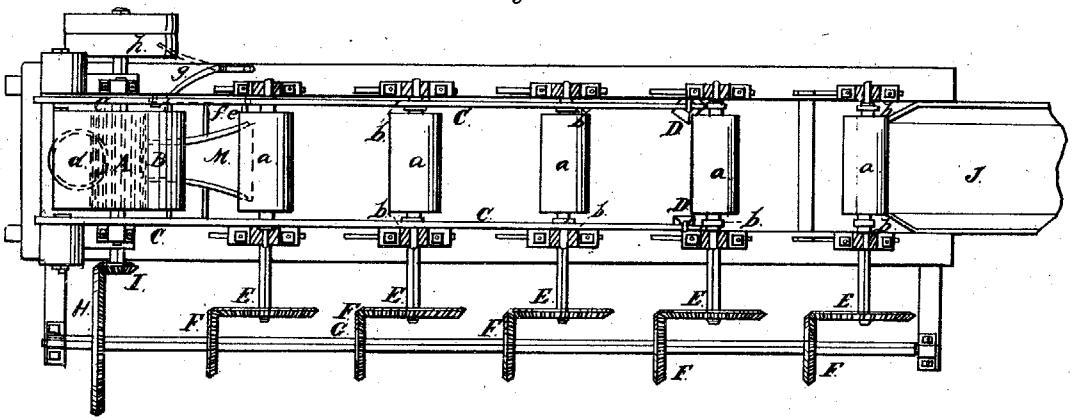

No Printed Specification Available

Sheet 1-4 Sheets.

2216X

J. F. Chappins.
Spinning Mach.

Patented Nov. 8, 1814.

N. PETERS, PHOTO-LITHOGRAPHER, WASHINGTON, D. C.

Sheet 2-4 Sheets.

2216X

J. F. Chapmans.

Spinning Mach.

Patented Nov. 8, 1814.

N. PETERS, PHOTO-LITHOGRAPHER, WASHINGTON, D. C.

Sheet 3-4 Sheets.
2216X
J. F. Chapmans.
Spinning Mach.
Patented Nov. 8, 1814.
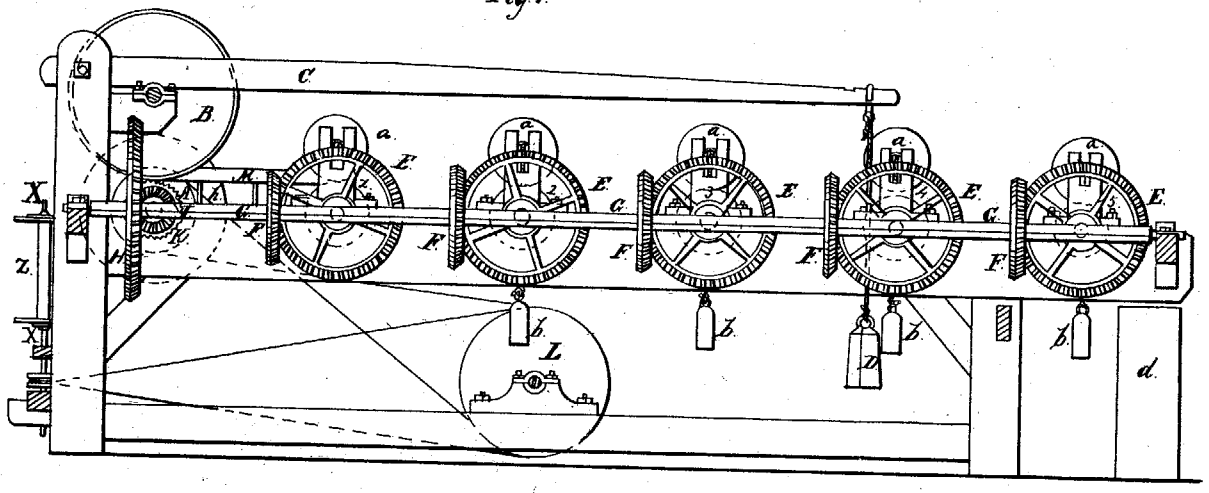
N. PETERS, PHOTO-LITHOGRAPHER, WASHINGTON, D. C.

Sheet 4-4 Sheets.

2216X

J. F. Chapmans.
Spinning Mach.

Patented Nov. 8, 1814.

N. PETERS, PHOTO-LITHOGRAPHER, WASHINGTON, D. C.

Nov. 8, 1814

John Francis Chappuis

Letters Patent

The Schedule referred to in these Letters Patent and making part of the same containing a description in the words of the said John Francis Chappuis himself of his machine for spinning Flax & Hemp. —

This machine is a system composed of five wooden rollers, and one iron fluted cylinder in front of the machine. This cylinder is 3 1/6 inch diameter and receives pressure from a wooden roller of from 7 to 8 inches diameter covered with leather in order to give it more elasticity at each end of this upper roller is a lever 3 feet long at the end of which is fixed a weight of from 25 to 30 lbs. The five wooden rollers that are fixed on the same principle one after the other at a distance of about 9 inches, are each pressed by another wooden roller on each side of which hangs a weight to give more pressure in order the better to combine the fibres of flax. These weights are of about 7 lbs. The first wooden roller is 3 1/6 inch diameter, the 2d of 3 1/12. the the 3d of 3. the 4th of 2 11/12 the 5th of 2 10/12 Inches. This difference exists in order that each cylinder may have some draft on the next for the purpose of keeping the material always well extended, These rollers turn by means of a bevel wheel fixed at the end of each, and receiving their motion from other wheels fixed on a shaft that receives its motion from a communication wheel turning with a pinion situated on a shaft of the iron fluted cylinder. The flax that passes between the 5 wooden rollers weighs 15 ounces taking an extent of 12 feet 6 inches. The iron fluted cylinder situated in front of the machine moves 15 times quicker than the 5 wooden rollers by which means the flax passing through the cylinder is 15 times thinner.

This operation is necessary because the flax entering the machine comes out of a box of 20 feet long placed behind the machine. This box is about 5 inches wide and of a sufficient height to contain the mass of flax that weighs 15 ounces in an extent of 12 feet six inches. On each side of this box is a board of the

22116X same length, on which is drawn out the whole length one ounce of flax which is turned in the box each time the iron fluted cylinder has turned 15 times, when the machine stops of itself, by means of a catch fixed on the first wooden roller, which catch lifts a small lever that lets go a spring that corresponds with the moving strap. Thus each time the machine stops an ounce of flax is put in motion by this means the box always contains the same quantity of material.

It is clear that the flax spread out on the boards and which is turned in the box is very imperfect, and that the machine is rendering it 15 times thinner, its defects and irregularities are 15 times more imperceptible; consequently the ribbon or webbing thereby produced is already 15 times more perfect. what makes this machine as well as the 2d & 3d preparations equally adapted for preparing Hemp is that the 5 wooden Rollers can be at pleasure placed nearer or farther from each other. by preparing hemp they are placed farther and for flax nearer to each other, and in such a manner that between the centre of the iron fluted cylinder, and the centre of the second wooden roller there is a distance equal to the length of the material employed. The distance of the rollers are indifferent. The first wooden roller has no weights for pressures it serves merely to press by its own weight those fibres of flax that are shorter than the generality of the others. Between the iron fluted cylinder and the first wooden roller is a conductor of tin plate that serves to prevent any fibres of ~~the~~ flax from separating or passing alongside the large wooden roller, pressing on the iron fluted cylinder. The flax falling out of the cylinder falls in a tin tub which is removed and replaced by another when full.

Second preparation. This preparation is of the same construction as the first, the measures of the different pieces composing it are absolutely the same as the first. The only difference is that for this second preparation there is no box placed behind but instead of that a number of tin tubs containing ribbons of the first preparation. this number depends on the desired fineness of the yarn also on the qual

2216X ty of the flax. The more there is put behind the machine the
bigger will be the webbing coming out of it. In this machine a doub-
le set of rollers is employed that is to say there are two rollers
or cylinders on the same shaft whereas in the first there is bu
one. All the rest is absolutely the same. The use of this second pr
eration is to improve the defects the first preparation has left.
The webbing coming out of this preparation is 15 times more
perfect than that coming out of the first.
Third Preparation. This preparation is equal in construction
to the 2d excepting that on each side of the iron fluted cylinder the
is a spindle and spool on which the material coming out of the
cylinder twists itself so that it can be placed easier on the spin-
ning frame. These two spindles turn by means of drums fixed
on the lower part in the middle of the frame and that turn them
selves by means of a pulley situate on the shaft of the iron fluted
cylinder for spinning No 1, 2, 3 & 4. The twist ought to ha
one turn to 2 inches or 6 turns to a foot. This third prepa
ration is likewise supplied by a number of tin tubs containing
webbings coming out of the 2d preparation. The use of this 3d
preparation is not only to give the material a last perfection bu
is also necessary to twist the webbing
Spinning Machine. This machine has spindles on each side
on the top of this machine are placed the spools with the prepared
twist from the third preparation, each twist passes between a
iron cylinder of one inch and a wooden roller of 2 or 2 1/2 inches
thick situated under said spools and pressed on each other by
means of a hook drawn by a spring. From these the twist pa
and passes between two other wooden rollers, having no other pr
sure on each other than the proper weight of the upper roller.
These two rollers serve merely to guide the twist over a small
tin conductor which is placed between these rollers and an
iron cylinder with copper rollers of two inches diameter on
which presses a wooden roller that serves to pinch the ma

22168

[illegible] that comes out of the tin conductor. This pressure spreads likewise by means of a hook drawn by a spring fixed on the frame. From the upper rollers the flax goes on the spindles situated below them and that twist it to yarn.
The wooden rollers situated above the conductor move a little quicker than the upper iron cylinder in order to keep the twist always extended. The iron cylinder with copper rollers delivers thirty times quicker than the iron upper cylinder, by which means the yarn gets 30 times finer than the twist placed on the machine. By this means if there was yet any unevenness in the preparation it would be found 30 times more imperceptible in the yarn and 30 times more perfect. Under the cylinder with copper rollers is a box containing water, the copper rollers dipping in this water get wetted and turning wet the yarn also.
To obtain the different numbers of yarn the preparation twist must be made coarser or finer, or which answers the same purpose is to give to the cylinder with copper rollers more or less quickness in the iron upper cylinder. Disposition of the wheels. At the end of the machine is a shaft bearing a pulley on which is the moving strap; at the other end is a pinion of 30 teeth that turns each row of cylinders with copper rollers which each of them have at their end a wheel of 100 teeth. as these wheels of 100 teeth are too far from the pinion of 30 teeth to catch in one another, it is necessary to place between the pinion and the wheel of 100 teeth a communication wheel of which the number of teeth is indifferent, but one of 100 teeth is convenient to to fill the space. At the opposite end there are two wheels instead of one in order that the cylinder situated on this side may turn the same way with the opposite cylinder. By this means the cylinders with copper rollers receive their motion. At the end of the machine opposite to the last mentioned wheels and on the shaft of the last cylinder with copper rollers is a pinion of twenty teeth (This pinion of 20 teeth serves to give 30 stretches) moving with a communication wheel of 60 teeth – on this wheel of 60 teeth is fixed another pinion of 20 teeth moving with a great communication wheel of 232 teeth

22116X (The diameter of this wheel is indifferent but for the space existing between
cylinder with copper rollers and the upper iron cylinder a wheel of 252 teeth
is best adapted) The wheel of 252 [illegible] a wheel of 100 teeth fixed on
the upper iron cylinder and situated on the other side of the machine oppo-
to that where the moving pinion of 20 teeth is fixed which wheel of 10[illegible]
teeth turns the upper iron cylinder. The same communication wheel
of 252 teeth turns the upper iron cylinder on the other side by means
of a communication wheel of 36 teeth placed between the wheel of 2[illegible]
teeth and the wheel of 100 teeth fixed on the upper iron cylinder.
It will be hereby observed that on one side of the wheel of 252 teeth
[illegible] immediate with the wheel of 100 teeth and that on the opposite
side there is a communication wheel. This is in order to give to the two
upper iron cylinders similar motion. The heart that makes the
foot board rise or lower receives its motion from the upper iron
cylinder situated on the side of the machine Where are is fixed the fa[illegible]
moving Shaft. The spindles move by way of 3 drums, that have thei[r]
motion from a pulley situated on a vertical shaft which is perpendic-
ularly fixed under the fast moving shaft.
This last shaft has a bevel wheel of 150 teeth moving another bevel
wheel of 50 teeth situated on the vertical shaft which bears the pu[lley]
that moves the drums according to the twist it is intended to give to the
yarn. one of these last bevel wheels must be changed in order to gi[ve]
more or less quickness to the spindles. The machine contains 6[0]
Spindles. 30 on each side This machine can either spin flax or hemp by means of placin[g]
the upper iron cylinder at a greater or less distance from the cylinder
with copper rollers, which is done by moving the collars of the upper
iron cylinder higher or lower. these collars running in a groove [illegible]
in each of the supporters of the upper part of the machine.

Witnesses
Jno. [illegible] [illegible]
Ogden Edwards

J. J. Chappuis

Drawing Made
[illegible]

(2067 words) ([illegible])